US008575237B1

(12) United States Patent
Zaid et al.

(10) Patent No.: US 8,575,237 B1
(45) Date of Patent: Nov. 5, 2013

(54) CORROSION INHIBITOR SYSTEMS USING ENVIRONMENTALLY FRIENDLY GREEN SOLVENTS

(71) Applicant: Jacam Chemical Company 2013, LLC, Sterling, KS (US)

(72) Inventors: Gene H. Zaid, Sterling, KS (US); Stephen Philip Rivas, Sterling, KS (US); Thomas W. Burgoyne, Sterling, KS (US); David Jay Rose, Lyons, KS (US)

(73) Assignee: Jacam Chemical Company 2013, LLC, Sterling, KS (US)

( * ) Notice: Subject to any disclaimer, the term of this patent is extended or adjusted under 35 U.S.C. 154(b) by 0 days.

(21) Appl. No.: 13/922,007

(22) Filed: Jun. 19, 2013

Related U.S. Application Data

(63) Continuation-in-part of application No. 13/900,473, filed on May 22, 2013.

(51) Int. Cl.
*C08G 59/50* (2006.01)

(52) U.S. Cl.
USPC .......................................................... 523/400

(58) Field of Classification Search
USPC .......................................................... 523/400
See application file for complete search history.

(56) References Cited

U.S. PATENT DOCUMENTS

| | | | |
|---|---|---|---|
| 3,282,836 A | 11/1966 | Lurton et al. | |
| 3,427,190 A | 2/1969 | Murdock | |
| 3,847,726 A * | 11/1974 | Becker et al. | 428/416 |
| 3,956,208 A | 5/1976 | Hoki et al. | |
| 4,071,327 A | 1/1978 | Dorer | |
| 4,568,709 A | 2/1986 | Paar et al. | |
| 4,608,405 A | 8/1986 | DeGooyer | |
| 4,749,728 A * | 6/1988 | Craun et al. | 523/400 |
| 4,808,441 A | 2/1989 | Chattha et al. | |
| 4,863,525 A * | 9/1989 | Goel et al. | 134/22.19 |
| 5,037,885 A * | 8/1991 | Mori et al. | 525/65 |
| 5,045,359 A | 9/1991 | Wu | |
| 5,079,041 A | 1/1992 | Wu | |
| 5,082,698 A * | 1/1992 | Anderson et al. | 427/386 |
| 5,321,061 A * | 6/1994 | Anderson | 523/402 |
| 5,344,674 A | 9/1994 | Wu | |
| 5,407,591 A * | 4/1995 | Emert et al. | 508/225 |
| 5,576,416 A | 11/1996 | Walker | |
| 5,596,030 A | 1/1997 | Walker | |
| 5,851,311 A | 12/1998 | Diamant et al. | |
| 5,859,095 A * | 1/1999 | Moyle et al. | 523/402 |
| 5,936,059 A | 8/1999 | Zaid | |
| 5,945,164 A | 8/1999 | Zaid | |
| 5,989,362 A | 11/1999 | Diamant et al. | |
| 5,998,508 A | 12/1999 | Corley et al. | |
| 6,059,991 A * | 5/2000 | Gaglani et al. | 252/182.29 |
| 6,071,436 A | 6/2000 | Incorvia | |
| 6,258,920 B1 | 7/2001 | Starner et al. | |
| 7,407,687 B2 * | 8/2008 | Zaid et al. | 427/230 |
| 7,682,526 B2 | 3/2010 | Culley et al. | |
| 8,053,031 B2 | 11/2011 | Stanley et al. | |
| 2003/0054173 A1 * | 3/2003 | Ruddy | 428/413 |
| 2006/0264573 A1 * | 11/2006 | Bennett et al. | 525/107 |
| 2008/0319240 A1 | 12/2008 | Stark et al. | |
| 2009/0029173 A1 * | 1/2009 | Schramm et al. | 428/413 |
| 2009/0308534 A1 * | 12/2009 | Malone | 156/330 |
| 2010/0130655 A1 * | 5/2010 | Agarwal et al. | 524/145 |
| 2011/0020555 A1 * | 1/2011 | Wothke et al. | 427/386 |
| 2011/0195195 A1 | 8/2011 | Geisberger et al. | |
| 2011/0239969 A1 | 10/2011 | McDougall | |

FOREIGN PATENT DOCUMENTS

| | | |
|---|---|---|
| JP | S56109261 | 8/1981 |
| JP | S63301271 | 12/1988 |
| JP | H03239765 | 10/1991 |
| JP | H07216057 | 8/1995 |
| JP | H08311392 | 11/1996 |
| JP | H09208972 | 8/1997 |
| JP | H1067995 | 3/1998 |
| JP | H10120973 | 5/1998 |
| JP | H10182796 | 7/1998 |
| JP | 2006110793 | 4/2006 |
| JP | 2009254939 | 11/2009 |
| JP | 2012214686 | 11/2012 |

OTHER PUBLICATIONS

Sandvik et al. "Characterization of Petroleum Sulfonates." Society of Petroleum Engineers Journal, 1977, 17:3, pp. 184-192.

* cited by examiner

*Primary Examiner* — Mark Eashoo
*Assistant Examiner* — Megan McCulley
(74) *Attorney, Agent, or Firm* — Hovey Williams LLP

(57) ABSTRACT

Improved anti-corrosion systems or products are disclosed containing individual epoxy and curing agent fractions dispersed in low VOC ester-containing dispersants. Preferably, the epoxy fraction is a conventional epoxy resin, whereas the curing agent is an imidazoline. The dispersant advantageously includes a mixture of carboxylic acid esters, such as alkyl glutarate, succinate, and adipate esters.

19 Claims, 4 Drawing Sheets
(4 of 4 Drawing Sheet(s) Filed in Color)

CORROSION INHIBITOR SYSTEMS USING ENVIRONMENTALLY FRIENDLY GREEN SOLVENTS

CROSS-REFERENCE TO RELATED APPLICATION

This application is a continuation-in-part of identically-titled U.S. patent application Ser. No. 13/900,473, filed May 22, 2013, which is incorporated herein by reference in its entirety.

BACKGROUND OF THE INVENTION

1. Field of the Invention

The present invention is concerned with improved anti-corrosion systems or products for application to metal surfaces and including epoxy and curing agent fractions dispersed in an ester-containing dispersant. More particularly, the invention is concerned with such products and methods of use thereof, wherein the epoxy/curing agent materials are dispersed in relatively fast-drying carboxylic acid ester dispersants exhibiting low volatile organic compound (VOC) levels and which substantially prevent phase separation between the components of the products.

2. Description of the Prior Art

It is well known that oil and gas wells are subject to extensive corrosion. Downhole equipment such as sucker rods, pump rods, tubing and casing are generally made of mild steel which is adversely affected by the production fluid of the well. The often high temperatures and acidic nature of the production fluids and formation waters magnifies these corrosion problems. Additionally, oil or gas-conveying pipelines are also prone to corrosion. Of course, a variety of other metal surfaces are subject to corrosion problems, in addition to oil and gas equipment.

A variety of anti-corrosion systems have been described in the past. Many corrosion inhibitors are aqueous dispersions containing a variety of components, e.g., 2-mercaptobenzothiozole, benzotriozole, tolyltriozole, phosphates, polyphosphates, organic soluble polymers, silicates, dithiocarbamates, nitrites, oxazoles, imidazoles, imidazolines, lignands, lignosulfates, tannins, phosphoric acid esters and boric acid esters. Many of these inhibitors are very prone to freezing during cold weather, making them very difficult to handle and maintain. Moreover, the useful life of many prior anti-corrosion treatments is very short, e.g., a week or less.

U.S. Pat. Nos. 5,936,059 and 5,945,164 describe highly useful anti-corrosion systems and methods particularly suited for oil and gas recovery and conveying equipment. The systems of the invention include an epoxy component as well as an amine curing agent component, which are either mixed together at the introduction site, or are simultaneously injected into a well or pipeline. A problem has arisen, however, when extremely long pipelines or deep wells require treatment. In such cases, the admixed epoxy and curing agent components tend to prematurely cure prior to application along the full length of the well or pipeline, meaning that certain portions of the equipment are not successfully treated. See also U.S. Pat. No. 4,526,813.

U.S. Pat. No. 7,407,687 describes an application technique wherein epoxy/curing agent anti-corrosion products are sequentially applied in overcome any issues of premature curing.

The prior anti-corrosion products described in the '059, '164, and '687 patents typically contain high VOC dispersants or solvents, such as xylene, toluene, or heavy aromatic napthas (HAN), and these materials can thus present an environmental issue. Moreover, these compositions may suffer from undue phase separation prior to use thereof.

There is accordingly a need in the art for improved epoxy/curing agent anti-corrosion systems or products which make use of relatively fast-drying dispersants or solvents having low VOC characteristics and which inhibit phase separation.

SUMMARY OF THE INVENTION

The present invention overcomes the problems outlined above, and provides improved anti-corrosion systems or products characterized by the use of low VOC ester-containing dispersants. The products comprise a first component including an epoxy active ingredient in a first compatible dispersant, and a curing agent for the epoxy in a second compatible dispersant; the first and second dispersants each comprise selected esters containing —COO— ester groups or linkages. Preferably, the first and second dispersants are identical and each comprise a mixture of carboxylic acid esters.

Advantageously, the epoxy component may comprise any of the conventional epoxy resins dispersed in an ester-containing dispersant, with the epoxy being present at a level of from about 10-50% by volume, more preferably from about 15-40% by volume. Similarly, the curing agent component is preferably an imidazoline dispersed in an ester-containing dispersant, again at a level of from about 10-50% by volume, more preferably from about 15-40% by volume. Preferably, the first and second dispersants are identical and contain a plurality of polycarboxylic acid esters, and especially dicarboxylic acid alkyl esters selected from the group consisting of C5-C40 alkyl diesters. Dispersants containing respective quantities of glutaric, succinic, and adipic acid diesters are especially useful.

The preferred epoxy and curing agent components are described in the aforementioned U.S. Pat. Nos. 5,936,059, 5,945,164, and 7,407,687, and these patents are accordingly incorporated by reference herein in their entireties.

As used herein, "dispersant" or "dispersion" is intended to mean all types of liquid mixtures, including suspensions, colloids, and solutions. "Substituted" with respect to chemical compounds refers to any substituent or moiety (e.g., a metal atom or organic group) bound to the compounds and which does not substantially alter the characteristics of the compounds in the context of the disclosed uses thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The Anti-Corrosion Systems of the Invention

Figure 1:
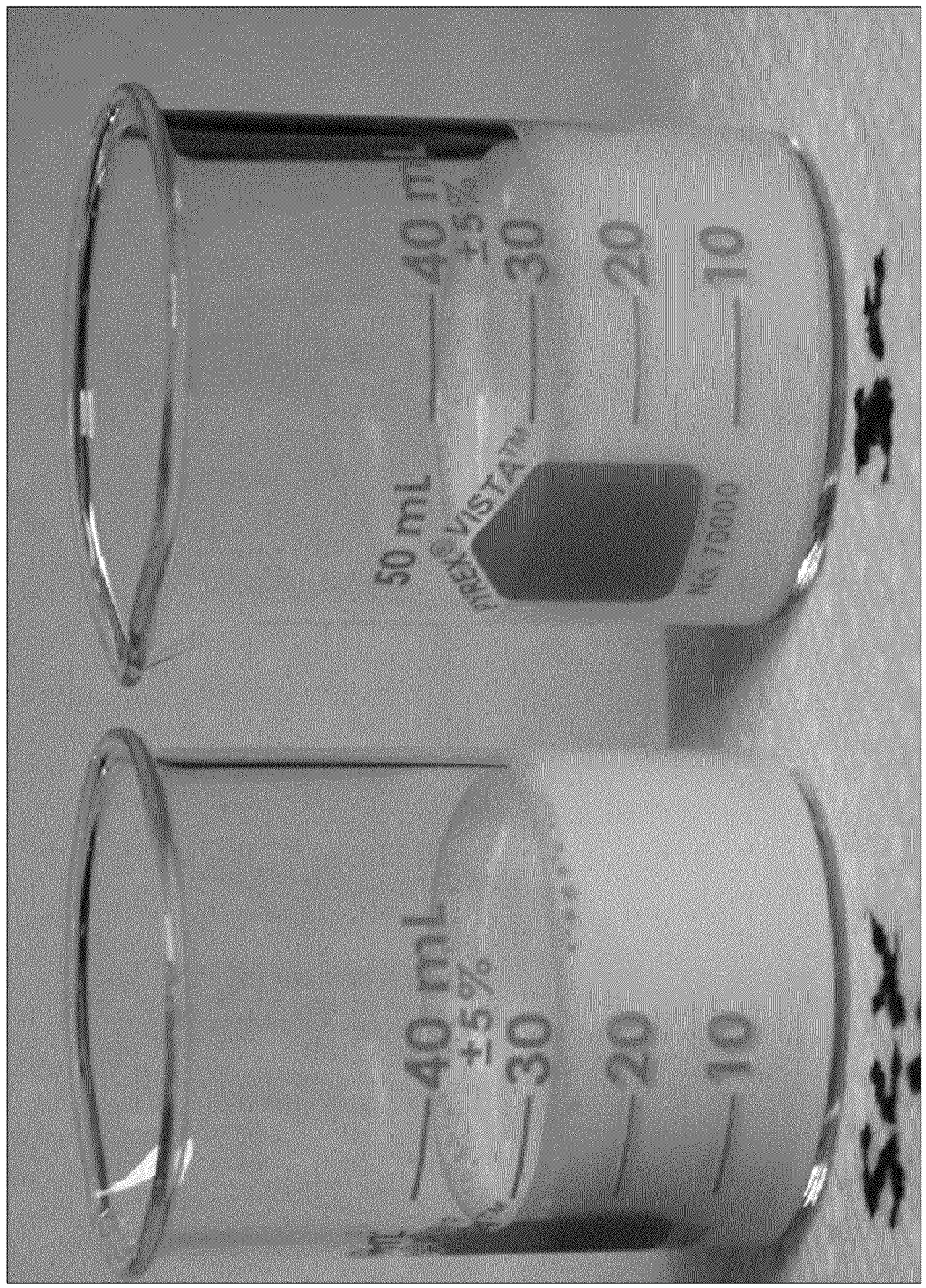
FIG. 1 is a photograph illustrating corresponding dispersions of a known epoxy/curing agent corrosion inhibitor in HAN solvent (right-hand beaker) and in an ester solvent in accordance with the invention (left-hand beaker), at a zero wait time.

As explained previously, the anti-corrosion products or systems of the invention contain three principal ingredients or components, namely an epoxy component, a curing agent component, and an ester-containing dispersant or solvent. These components are individually described below.

1. The Epoxy Component

A variety of epoxies can be used in the invention. Generally, any epoxy resin having, on the average, more than one vicinal epoxy group per molecule can be used in the composition and process of the invention. The epoxy resin may be saturated or unsaturated, aliphatic, cycloaliphatic, aromatic or heterocyclic, and may bear substituents which do not materially interfere with the curing reaction.

Suitable epoxy resins include glycidyl ethers prepared by the reaction of epichlorohydrin with a compound containing a hydroxyl group (e.g., bisphenol A) carried out under alkaline reaction conditions. Other suitable epoxy resins can be prepared by the reaction of epichlorohydrin which mononuclear di- and tri-hydroxy phenolic compounds such as resorcinol and phloroglucinol, selected polynuclear polyhydroxy phenolic compounds such as bis(p-hydroxyphenyl) methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 1500 to about 2000. The commercially available Epon 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185-192, is presently preferred.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like, with unsaturated alcohols.

In addition to the foregoing, it is contemplated that suitable polyepoxides can be derived from esters prepared from unsaturated alcohols and unsaturated carboxylic acids. Representative epoxidized esters include the following: 2,3-epoxypentyl-3,4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododedcyl-3,4-epoxypentanoate; 3,4-epoxyoctyl-2,3-epoxycyclododecane carboxylate and the like.

Other unsaturated materials which can be epoxidized to give resins suitable for use include butadiene based polymers such as butadiene-styrene copolymers, polyesters available as derivatives of polyols such as ethylene glycol with unsaturated acid anhydrides such as maleic anhydride and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-carboxylate; dioctyl 3, 4,7,8-diepoxyhexadecanedioate; diethyl 5,6,9,10-diepoxytetradecanedioate and the like.

Dimers of dienes such as 4-vinyl cyclohexene-1 from butadiene and dicyclopentadiene from cyclopentadiene can be converted to epoxidized derivatives which are suitable for use.

2. The Curing Agent Component

Imidazoline and various derivatives thereof are the preferred curing agent component. These preferred species are set forth in the following structural formula:

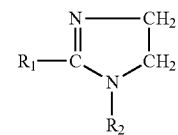

wherein $R_1$ is hydrogen or an alkyl group having up to 18 carbon atoms therein, and $R_2$ is hydrogen, or an alkyl or amine group having up to 18 carbon atoms therein. The presently most preferred curing agent is imidazoline itself (C3H6N2), including the 2-, 3-, and 4-imidazoline isomers.

The alkoxylated amine curing agents may also be used with or in lieu of the imidazoline curing agents. Useful alkoxylated amines may be aliphatic, cycloaliphatic, aromatic or heterocyclic. The alkoxylated polyamines, especially the alkoxylated N-alkyl- and N-alkylenyl-substituted 1,3-diaminopropanes and mixtures thereof may be used. Examples of such alkoxylated polyamines include alkoxylated N-hexadecyl-1, 3-diaminopropane, N-tetradecyl-1,3-diaminopropane, N-octadecyl-1,3-diaminopropane, -pentadecyl-1,3-diaminopropane, N-heptadecyl-1,3-diaminopropane, N-nonadecyl-1,3-diaminopropane, and N-octadecenyl-1,3-diaminopropane. Various commercially available mixtures of ethoxylated -alkylated and N-alkenylated diamines can be used in the invention. The presently preferred polyamine is a commercial product, ethoxylated-tallow-1,3-diaminopropane, where the degree of ethoxylation is approximately 10 moles ethoxylate per mole of tallow diamine.

3. The Ester Dispersants

The ester dispersants in accordance with the invention, for both the epoxy and curing agent components, are dispersible in water at ambient temperature, and remain liquid at temperatures of from about −20-200° F., more preferably from about 20-110° F. The dispersants are substantially free of water (no more than about 5% by weight water, more preferably no more than about 2% by weight), and serve principally as a carrier for the epoxy and curing agent materials, and, as these materials react, the resulting epoxy/curing agent adducts. Thus, the ester dispersants do not react with or modify to any significant extent either the epoxy materials, the curing agent materials, and/or the epoxy/curing agent adducts. That is, any chemical interactions between the ester dispersants and the other ingredients and reaction products of the mixtures of the invention would be minor and unintended side reactions, and would not fundamentally alter the chemical characteristics of the epoxy materials, the curing agent materials, or the epoxy/curing agent adducts.

The types of useable esters are quite broad, encompassing C8-C40 mono ester compounds each having one —COO— ester group, C4-C40 polycarbpxylic ester compounds each containing 2 or more —COO— ester groups per molecule, and mixtures thereof. Such esters are normally derived from the esterification of substituted or unsubstituted, saturated or unsaturated C7-C24 straight, branched chain, or cyclic alkyl, alkenyl, alkynyl, and aromatic monocarboxylic acids, C3-C24 straight, branched chain, or cyclic alkyl, alkenyl, alkynyl, and aromatic di-, tri-, or higher polycarboxylic acids, and mixtures thereof. In many instances, it is preferred that the first and second dispersants respectively and individually comprise one or more dicarboxylic acid esters derived from the esterification of C3-C15 alkyl dicarboxylic acids, with the final diesters being C4-C40 diesters.

Useful carboxylic acids which may be esterified and used as dispersants in accordance with the invention include: C7-C24 monocarboxylic acids, such as heptanoic, octanoic, nonanoic, decanoic, lauric, myristic, palmitic, stearic, palmitoleic, oleic, linoleic, linolenic, and benzoic; C3-C24 dicarboxylic acids, such as propanedioic (malonic), butanedioic (succinic), pentanedioic (glutaric), hexanedioic (adipic), heptanedioic (pinelic), octanedioic (suberic), nonanedioic (azelaic), decanedioic (sebacic), undecanedioic, dodecanedioic, maleic, glutaconic, traumatic, muconic, itaconic, phthalic, isophthalic, terephthalic; and tricaroboxylic acids, such as citric, isocitric, aconoicic, carballyic, and trimesic.

The carboxylic acids are normally esterified using one or more organic alcohols, and again the class of useable alcohols is quite broad, including straight, branched chain, or cyclic, saturated or unsaturated C1-C24 alkyl, alkenyl, alkynyl, and aryl alcohols containing one or more —OH alcohol groups. The preferred alcohols used in the esterification of the carboxylic acids are the straight, branched chain, or cyclic C1-C15 mono-, di-, and tri-alcohols.

Particularly preferred dispersants comprise esters derived from C5-C15 alkyl dicarboxylic acids, and even more preferably C4-C8 alkyl dicarboxylic acids such as glutaric, succinic, and adipic acids, esterified using C1-C15 straight or branched chain organic alcohols. A commercially available product RHODISOLV DIB may be used in the invention and is essentially completely an adipic acid diisobutyl ester (C14H26O4, CAS #141-04-8) having a molecular weight of 258.36. However, for reasons of cost and ready availability, it is preferred to use mixtures of esters derived form the manufacturing waste generated during nylon manufacturing. For example, the ESTASOL solvents may be used, which are essentially anhydrous mixtures containing from about 15-25% by weight dimethyl succinate (CAS #106-65-0), from about 12-23% by weight dimethyl adipate (CAS #627-93-0), and from about 55-65% by weight dimethyl glutarate. (CAS #1119-40-0).

Whatever ester-containing dispersant(s) are employed, it is preferred that the total of the ester groups (—COO—) in the complete dispersant (i.e., the complete dispersant whether made up of 1 ester species or a plurality thereof and any other dispersant components) ranges from about 15-50% by weight, more preferably from about 30-45% by weight, based upon the total weight of a given volume of the complete dispersant taken as 100% by weight.

The Complete Anti-Corrosion Systems

The anti-corrosion systems of the invention, comprising epoxy and curing agent components in compatible ester-containing dispersants, can be used as a pre-mixed composition containing all of the components combined in a single liquid, i.e., the epoxy, curing agent, and dispersant. In such uses, the pre-mixed composition is prepared at or near the time of application thereof by mixing together the individual epoxy and curing agent components. This is done so as to assure that there is no undue pre-reaction between the epoxy and curing agent prior to application thereof to surfaces to be protected. In alternate uses, the epoxy and curing agent components may be sequentially applied to surfaces to be protected, as described in U.S. Pat. No. 7,407,687.

Considering first the respective epoxy and curing agent components as individual compositions, each should have the active epoxy or curing agent present in the dispersant at a level of from about 10-50% by volume, more preferably from about 15-40% by volume, with the dispersant making up the balance of the individual compositions. When the epoxy and curing agent components are combined as a single composition, the epoxy fraction should be present at a level of from about 25-50% by volume, more preferably from about 30-40% by volume; the curing agent fraction should be present at a level of from about 25-50% by volume, more preferably from about 30-40% by volume; and the dispersant should be present at a level of from about 5-50% by volume, more preferably from about 20-40% by volume. The ratio of the curing agent to the epoxy fraction in the overall systems should be from about 1-4 parts by weight curing agent to each part by weight epoxy, more preferably from about 2-3 parts by weight curing agent to each part by weight epoxy. The most preferred systems include Epon 828 epoxy resin, imidazoline curing agent, and with the first and second dispersants being identical and each containing quantities of C1-C6 alkyl esters of glutaric acid, succinic acid, and adipic acid.

The anti-corrosion systems of the invention find particular utility in the treatment of metal surfaces of oil and gas recovery or conveying equipment. In such situations, the individual epoxy and curing agent components may be sequentially applied to such surfaces in any order, or these components may be pre-mixed and applied together. In either case, the compositions provide significant protection against corrosion typically seen in such contexts. The anti-corrosion systems of the invention can be used in a wide variety of other situations where corrosion problems exist. To give one example, the systems may be applied to the inner surfaces of liquid tanks forming a part of rail cars or tanker trucks. In these contexts, the anti-corrosion systems may be applied by spraying, rolling, painting, or any other convenient method. Once the liquid system is applied to a metal surface, the epoxy and curing agent materials react and cure, with the ester dispersants substantially completely evaporating into ambient air, leaving the dried, reacted residue of the systems as thin anti-corrosion protective layers.

The systems of the invention can also be applied to downhole equipment in oil or gas wells. This is typically done by injecting the liquid system, or the individual components thereof in any sequential order, into a well. If formation water is present in the well, the active epoxy and curing agent components form a protective layer on the downhole equipment, while the dispersant is merely dissolved in the formation water.

A chief advantage of the anti-corrosion systems of the invention is that the VOC levels are drastically reduced, as compared with the prior systems making use of organic solvents, such as toluene or HAN solvents. In addition, it has been discovered that the combined-component anti-corrosion systems of the invention resist phase separation to a much higher degree than the conventional systems.

EXAMPLE 1

Preferred dispersants in accordance with the invention may be prepared using the following ingredients:

| COMPONENT | RANGE | PREFERRED AMOUNT |
|---|---|---|
| glutaric acid ((C3H6(COOH)2) | 10-60% | 30% |
| succinic acid (HOOC—(CH2)2—COOH) | 2-25% | 10% |
| adipic acid ((CH2)4(COOH)2) | 0-15% | 4% |
| isobutanol ((CH3)2CHCH2OH) | 10-85% | 50% |
| phosphoric acid (H3PO4) | 1-5% | 2% |
| sodium bicarbonate (NaHCO3) | 1-5% | 4% |

The ester dispersant was prepared using the preferred amounts of acids, isobutanol, and phosphoric acid set forth above. The glutaric, succinic, and adipic acids, together with isobutanol and phosphoric acid, were first charged into a reactor with stirring. The reaction mixture was heated with stirring and refluxing to 237° F. (114° C.), and the reaction was allowed to proceed until the temperature dropped to 230° F. (110° C.). The distillate was collected at a slightly higher temperature of approximately 240° F. Additional isobutanol was added to the reactor in a weight amount equal to that of the collected distillate. The reaction was continued by collection of reflux at 10 minutes, 30 minutes, 1 hour, 2 hours, 3 hours, 4 hours, 5 hours, and 5.5 hours with further additions of isobutanol equaling the weight amounts of the collected distillate. The reaction was monitored by IR to determine the loss of the 1711 $cm^{-1}$ carboxylic acid peak, and growth of the 1735 $cm^{-1}$ ester peak, and by gas chromatography. At the end of 6 hours reaction time, the mixture was reflux cooled to 230° F. (110° C.). At that point, the sodium bicarbonate was added slowly and carefully, because it created foaming and bubbling with a large amount of carbon dioxide being released from the reactor. In the final step, the mixture was heated to 248° F. (120° C.) for 2 hours. The mixture was then purged with nitrogen to remove any remaining water and isobutanol. The mixture was then cooled to room temperature and dried under a vacuum to remove any residual water and isobutanol. The mixture was then checked by gas chromatography to ensure that all isobutanol had been removed, and filtered.

In the foregoing method, the acids used were essentially pure. However, as noted previously, a waste stream from nylon manufacture may be used in lieu of the pure acids. Such waste streams can differ from batch to batch, but all contain the preferred glutaric, succinic, and adipic acids, and may also contain other carboxylic acids and metal salts. In the use of these waste mixtures, it may be appropriate to initially load the reactor with the waste stream acid blend, and heat to 220° C. for 3 hours and/or add 1000 ppm copper metal. These steps are reported to reduce the color of the final product (U.S. Pat. No. 3,991,100, incorporated by reference herein).

It is desirable to remove the water produced during the esterification reaction, which may be accomplished by the above-described technique of distilling water/isobutanol mixtures, followed by adding back isobutanol in a weight amount equal to the distillate. Alternately, the water/isobutanol mixture can be distilled, followed by fractional distillation of the isobutanol and returning this isobutanol to the reaction vessel. As a further option, the distilled water/isobutanol mixture is passed through activated molecular sieves, followed by pumping the recovered isobutanol back into the reactor.

Solvents made in accordance with this Example can be used both the epoxy and curing agent components of the overall anti-corrosion systems of the invention.

EXAMPLE 2

In order to determine the relative degree of phase separation of components between a prior art anti-corrosion system using HAN solvent, versus an anti-corrosion system using an ester dispersant in accordance with the invention, the following test was conducted. First, a sample of a known anti-corrosion system was provided by mixing in a beaker one part by weight of an epoxy fraction A, made up of 35% by weight Epon 828 epoxy dispersed in 65% by weight HAN solvent, and one part by weight of a curing agent fraction B, made up of about 5% by weight ethoxylated tallow diamine and about 30% by weight imidazoline dispersed in 65% by weight HAN solvent. Three parts by weight of water were also added to the beaker.

Second, a sample of an anti-corrosion system in accordance with the invention was prepared by mixing in another beaker one part by weight of an epoxy fraction A', made up of 35% by weight Epon 828 epoxy in the previously described RHODISOLV DIB ester solvent, and one part by weight of a curing agent fraction B', made up of 35% by weight imidazoline in 65% by weight RHODISOLV DIB ester solvent. Three parts by weight of water was also added in this beaker.

Figure 2:
FIG. 2 is a photograph similar to that of FIG. 1, but illustrating the dispersions after 15 minutes wait time.
Figure 3:
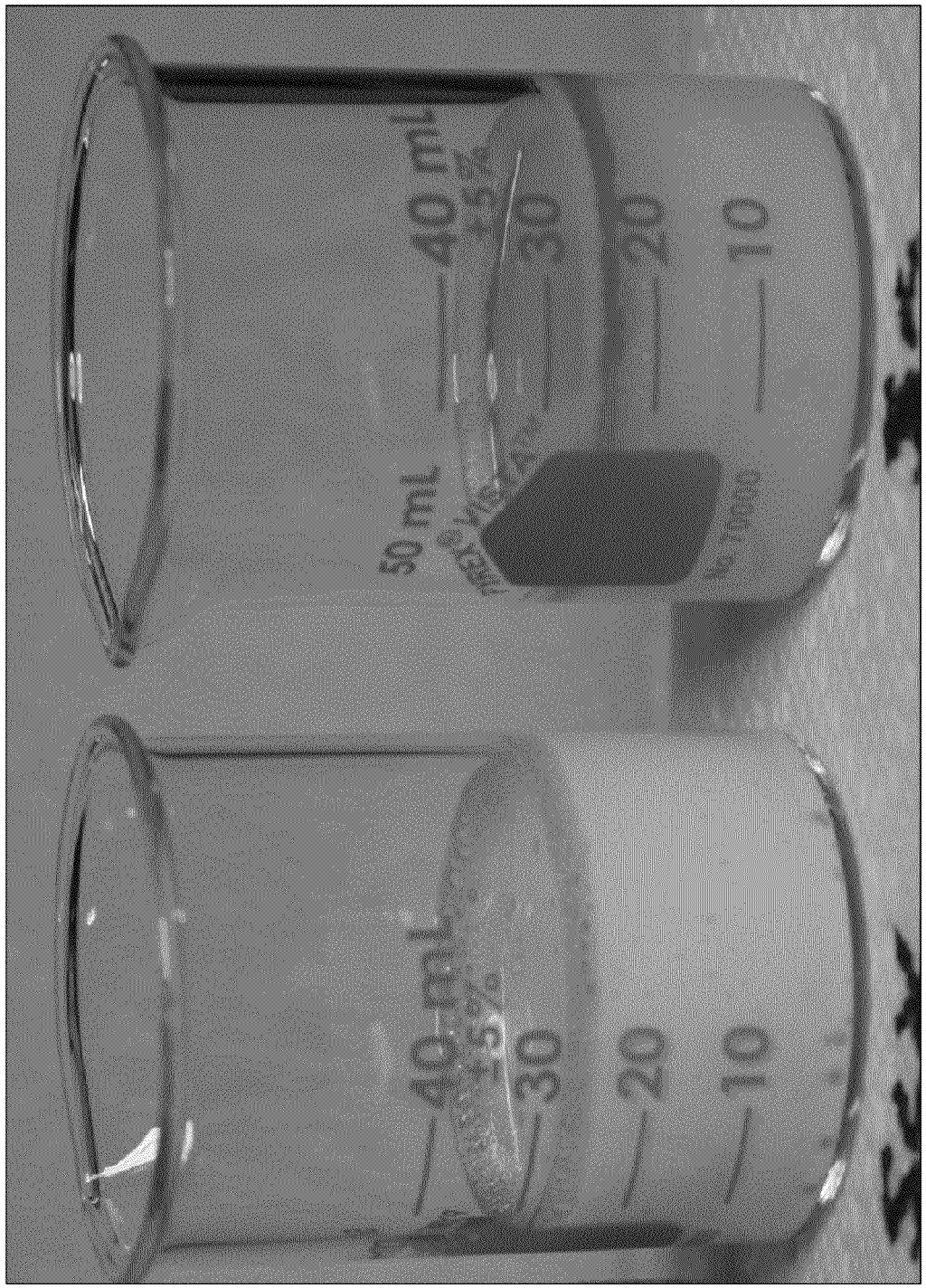
FIG. 3 is a photograph similar to that of FIG. 1, but illustrating the dispersions after 30 minutes wait time.
Figure 4:
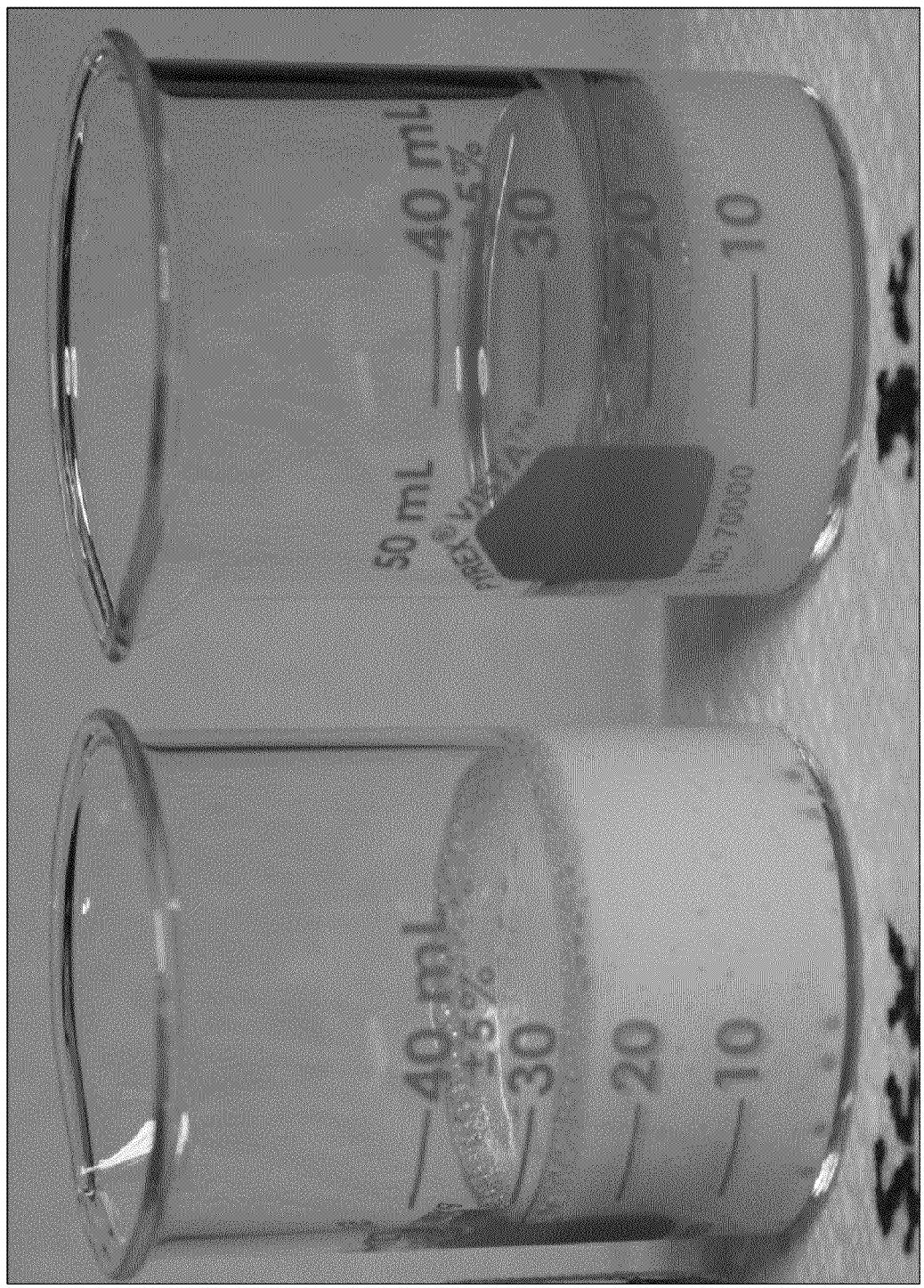
FIG. 4 is a photograph similar to that of FIG. 1, but illustrating the dispersions after 40 minutes wait time.

Photographs were taken at times 0, and at wait times of 15, 30, and 40 minutes, shown as FIGS. 1-4, respectively. As is readily apparent, at time 0, the test systems were essentially the same in terms of color and separation of ingredients. However, as the test proceeded, the ingredients of the prior art system displayed a marked tendency to separate, whereas the system of the present invention displayed virtually no separation.

We claim:

1. A liquid anti-corrosion product designed for application to metal surfaces and comprising a first component including an epoxy ingredient in a first compatible dispersant, and a second component comprising a curing agent for the epoxy in a second compatible dispersant, said first and second dispersants serving as a carrier for the epoxy and curing agent and which do not react to any significant degree with the epoxy, curing agent, and/or any epoxy/curing agent adducts, said first and second dispersants each comprising at least one ester selected from the group consisting of C8-C40 monocarboxylic acid esters, C4-C40 polycarboxylic acid esters, and mixtures thereof, said first and second dispersants each being present in the corresponding component at a level of from about 50-90% by volume, and said product being substantially free of water.

2. The product of claim 1, said curing agent selected from the group consisting of alkoxylated amines and imidazolines, and mixtures thereof.

3. The product of claim 1, said first and second components being mixed together.

4. The product of claim 1, said first and second components being separate.

5. The product of claim 1, said epoxy being present at a level of from about 10-50% by volume in said first dispersant, and said curing agent being present at a level of from about 10-50% by volume in said second dispersant.

6. The product of claim 1, said first and second dispersants being identical.

7. The product of claim 1, said first and second dispersants each including at least one C4-C40 polycarboxylic acid ester.

8. The product of claim 1, said first and second dispersants comprising a plurality of said esters.

9. The product of claim 8, said first and second dispersants comprising a plurality of C4-C40 dicarboxylic acid esters.

10. The product of claim 9, said dicarboxylic acid esters selected from the group consisting of isobutyl esters of dicarboxylic acids selected from the group consisting of glutaric, succinic, and adipic acids, and mixtures thereof.

11. The product of claim 1, the total of the ester groups (—COO—) in each of said first and second dispersants ranging from about 15-50% by weight, based upon the total weight of a given volume of the complete dispersant taken as 100% by weight.

12. A method of treating a metal surface comprising the steps of applying an anti-corrosion product in accordance with claim 1 to the metal surface, and causing said epoxy and curing agent to react and form an anti-corrosion layer on said metal surface.

13. The method of claim 12, said applying step comprising the steps of first mixing together said first component and said second component to form a combined composition, and thereafter applying the combined composition to the metal surface.

14. The method of claim 13, said applying step comprising the steps of first applying one of said first and second components to said metal surface, and thereafter applying the other of said first and second components to the metal surface, and causing the first and second components to react and form said anti-corrosion layer on the metal surface.

15. An anti-corrosion product comprising a liquid composition including an epoxy, a curing agent for the epoxy, and a dispersant for the epoxy and curing agent, said dispersant serving as a carrier for the epoxy and curing agent and does not react to any significant degree with the epoxy, curing agent, and/or any epoxy/curing agent adducts, said dispersant comprising at least one ester selected from the group consisting of C8-C40 monocarboxylic acid esters, C4-C40 polycarboxylic acid esters, and mixtures thereof, said dispersant being present in said product at a level of from about 20-50% by volume, and said product being substantially free of water.

16. The product of claim 15, said dispersant comprising a mixture of said C4-C40 polycarboxylic acid esters.

17. The product of claim 15, said epoxy being present at a level of from about 25-50% by volume, said curing agent being present at a level of from about 25-50% by volume, and said dispersant being present at a level of from about 20-50% by volume, said product being substantially free of water.

18. The product of claim 15, the ratio of said curing agent to said epoxy being from about 1-4 parts by weight of curing agent for each part by weight epoxy.

19. The product of claim 15, said dispersant comprising individual quantities of esters of glutaric acid, succinic acid, and adipic acid.

* * * * *